July 22, 1952 A. J. TORRE 2,604,583

SAFETY CONTROL FOR MINIMIZING SHOCK HAZARD FROM RELATED PARTS OF ELECTRICAL APPARATUS

Filed May 5, 1948

INVENTOR
ALTON J. TORRE
BY Philip G. Cooper
ATTORNEY

Patented July 22, 1952

2,604,583

UNITED STATES PATENT OFFICE 2,604,583

SAFETY CONTROL FOR MINIMIZING SHOCK HAZARD FROM RELATED PARTS OF ELECTRICAL APPARATUS

Alton J. Torre, Westmont, N. J., assignor to Radio Corporation of America, a corporation of Delaware Application May 5, 1948, Serial No. 25,222

10 Claims. (Cl. 250—16)

This invention pertains to a safety control and more particularly to a safety control for power operated appliances.

While the invention may be used in conjunction with many types of electrical equipment, it will be described in relation to electronic equipment, for example, power operated appliances, such as radio receivers, television receivers, record players, recorders, and similar equipment which frequently require control and adjustment.

One of the problems in manufacturing equipment of this type is to provide a control on the exterior of a cabinet, or equivalent overall enclosure, for all live or current carrying parts which are exposed and which involve the hazard of shock, and yet keep the cost of manufacture down to a minimum.

Electrically live parts which involve shock hazard should be protected if accessible to the extent that they are touchable by a person. To overcome this problem, where the control is accessible externally of the cabinet or enclosure, it is necessary to provide a safety control for personal safety in operation of the electronic equipment disposed within a cabinet, so that the individual operating the equipment is protected at all times from electrical shock.

In manufacturing radio receivers of the transformer power supplying type, there is no shock hazard external of the cabinet because of the isolating characteristic of the transformer. Similarly, in the A. C.-D. C. type of radio receiver of a low frequency coverage of signal reception, such as in AM receivers, a design can be had wherein no shock hazards will exist, namely in that separate conductors may be used for the common return path of the currents in lieu of the chassis as the common return. However, in the use of FM receivers where high frequencies are to be received and amplified, the engineering problems of electrical isolation to avoid shock hazard, and the cost of equipment manufacturing is increased. To lessen these problems, it would be desirable to use the chassis as the return path for the electrical current. However, to do this would ordinarily involve shock hazard in the present type of construction.

While it is possible to use a return conductor on radio receivers of the FM type, the problem of design in electrical isolation becomes quite complex, and the cost of additional material, such as to provide better filtering and restriction of leakage currents, is appreciably increased.

The present invention obviates this problem in that the so-called "hot chassis" can be employed in the manufacture of the equipment, and with the use of the safety control as set forth herein, the electrified parts will, at no time, be exposed externally of the cabinet, whether or not the "hot chassis" is mechanically coupled to the safety control, thereby eliminating the shock hazard.

It is, therefore, an object of the present invention to provide a safety control for electronic equipment disposed within a cabinet so that at no time will the individual operating the equipment be exposed to shock externally of the cabinet when energy is applied to the power operated equipment disposed within the cabinet.

A further object of the invention is to provide a safety control to permit operation of electronic equipment externally of a cabinet and to prevent any of the electrified parts of the equipment from being exposed exteriorly of the equipment cabinet.

A further object is to provide a safety control for electronic equipment which control may be mechanically disconnected from the equipment without permitting exposure of an individual to shock from the electrified equipment through the aperture provided in the cabinet for the safety control.

A further object is to provide a safety control mounted on a cabinet panel which control cannot normally be removed from the panel whether or not the control is mechanically connected to equipment inside the cabinet.

A further object of the invention is to exteriorize a control member for electronic equipment disposed within a cabinet and permit the control member to function as a control means for the equipment and also as a cabinet closure at all times.

A further object of the invention is the provision of an electronic equipment enclosure having operable equipment control members disposed exteriorly of the enclosure, which controls are detachable from the equipment disposed within the enclosure, but undetachable from the enclosure.

Figure 1:
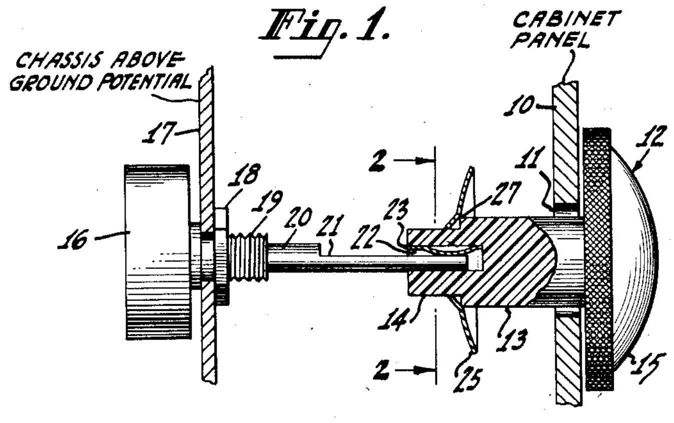
Figure 1 is a partial sectional view showing a safety control of the invention operatively connected to an instrument shaft, said safety control being disposed in relation to a cabinet panel.

Referring to the drawings and more particularly to Fig. 1, there is shown a cabinet panel 10 having an aperture 11 formed therein. One form of the safety control 12 has a body portion 13 with a reduced body portion 14 formed on one end thereof, the body portion and the reduced body portion being cylindrical in shape. The control head 15, which is shown in one representative form, is adapted to be gripped by a person, and is formed on the end of the body portion 13 opposite to the end of the reduced body portion 14. An electrical control instrument, such as a potentiometer 16, is secured to the metallic chassis 17 by means of a nut 18 of conductive material which is connected to the threaded portion 19, which threaded portion is a conductive part of the potentiometer 16. Tightening of the nut 18 secures the potentiometer 16 to the metallic chassis 17 to form an electrical connection therebetween. The shaft 20 is cylindrical in cross-sectional shape adjacent the threaded portion 19, and has a flat portion 21 on the free end thereof and is adapted to be inserted in the control body aperture 22. The cabinet panel 10 is so indicated by legend, and the chassis 17 has the legend "chassis above ground potential." Therefore the conductive parts above mentioned are likewise above ground potential. A resilient member 23, in the form of a spring, is disposed within an aperture 22 in the control body, and has an inclined surface so that the flat portion 21 of the shaft 20 may be inserted in the control body aperture 22 to frictionally engage the member 23. It will be seen that the instrument shaft, having a flat portion, will be keyed to the safety control 12 by engagement with the resilient member 23 so that rotation of the control knob will cause rotation of the instrument shaft 20.

Figure 2:
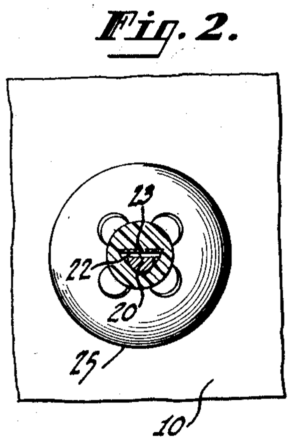
Figure 2 is a rear view partially in section taken along line 2—2 of Figure 1 to show the safety control retainer disposed in relation to the body of the control and the instrument shaft.
Figure 3:
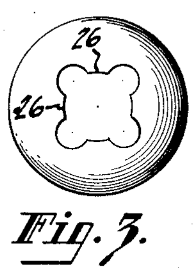
Figure 3 is a rear view of the form of a self-locking safety control retainer shown in Fig. 1.

A self-locking control retainer 25, shown in Figs. 1, 2, and 3, has protruding finger portions 26 extending toward the center of the control retainer 25 so that the fingers will frictionally engage the reduced body portion 14 as the retainer is pressed over the reduced body portion. The retainer 25 is cupped, and when pressed on the reduced body portion, will permit the fingers to frictionally slide over the body portion 14 into the position shown. Any movement of the retainer in the opposite direction will cause the finger portions to bite into the reduced body portion. As pressure is increased on the fingers due to the retainer movement to the left, the increased pressure will cause an increased bite of the finger portions into the reduced body portion to more securely lock the retainer onto the body portion. It will be seen, therefore, that once the self-locking retainer is pressed on the reduced body portion of the safety control, any attempt to remove the retainer will only secure it more positively to the reduced body portion of the safety control.

While the resilient retainer is shown being adapted for a safety control having a reduced body portion, with the inner surface of the retainer engaging a shoulder 27 formed between the main body portion and the reduced body portion of the safety control, which shoulder acts as a stop means, or a limiter for the retainer movement, it is to be understood that the body portion of the safety control may be of one size and may be employed without the use of a stop means or shoulder 27.

Figure 4:
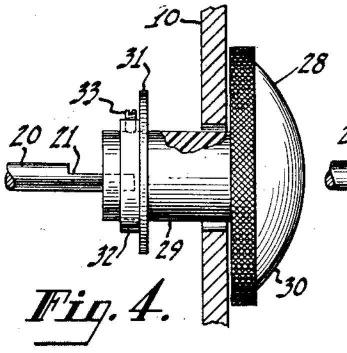
Figure 4 is a modification of the safety control retainer secured to the control body with the safety control mounted in relation to the cabinet panel and the instrument shaft.

Fig. 4 shows a modified form of the safety control 28 having a body portion 29 which is cylindrical in shape throughout its length, having one end of the body portion being formed on one side of the head portion 30 of the safety control 28. With the modified form of the retainer 31 shown in Fig. 4, the retainer 31 has a hub 32 secured to one side thereof with a screw 33 being threadedly connected to the hub so that inward movement of the screw will cause the screw to engage the outer surface of the body portion 29 of the safety control. It is pointed out that while the screw 33 may be metallic, it is shown as engaging the body portion, which is symbolically shown as insulation. A shaft 20 has a flat portion 21, and is connected to the safety control in a manner similar to that shown in Fig. 1. While a screw 33 is shown as connecting the retainer 31 to the body portion of the safety control, it is to be understood any suitable form of securing the retainer to the body portion of the safety control may be employed.

Figure 5:
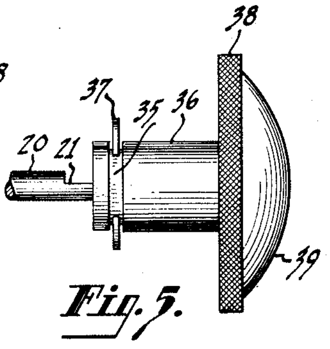
Figure 5 is another modified form of the retainer disposed on the modified body portion of the safety control, which control is connected to an instrument shaft.

Fig. 5 is a modified form of the safety control having an annular groove 35 formed in the body portion 36 of insulating material, and a clip-type C-washer 37, as shown, snapped into the annular groove 35, with the distance between the free ends of the C washer 37 being smaller than the diameter of the annular groove, so that the C washer 37 retainer will be resiliently secured to the safety control. The shaft 20 is connected to the safety control 38 having a head portion 39 formed as a part thereof, in a manner similar to that shown in relation to Fig. 1.

With the showing in Figs. 1 and 4, it will be seen that the safety control is connected to the shaft 20, and that the safety control so nearly fills the opening in the panel 10, that the safety control forms a closure for the panel opening. When the cabinet door 43 is closed, and the chassis and shaft 20 are electrified, that is the so-called "hot chassis" is employed with the chassis being above ground potential, it is impossible for a person to contact any electrified part externally of the cabinet. With this arrangement, it should be obvious that there is no possibility of shock hazard to the operation of the electronic equipment.

The distance between the retainer 25 and the cabinet panel 10 is greater than the distance the shaft 20 is inserted in the aperture 22 in the control body portion. It will also be seen that the depth of the aperture 22 is less than the distance between the retainer and the cabinet panel.

When the safety control 12 is operatively connected to the shaft 20, as shown in Fig. 1, the control head 15 is disposed in close proximity to the cabinet panel so that it will be impossible to insert a tool or other conductor from the exterior of the cabinet to the interior of the cabinet to engage or contact any of the electrified equipment by meddling.

Under certain conditions it may be desirable to mechanically disconnect the safety control from the equipment and still employ the safety control as a closure for the aperture in the cabinet panel. When the safety control is withdrawn from the instrument shaft so that the safety control is no longer mechanically connected thereto, the safety control retainer 25 may be drawn against the rear surface of the cabinet panel without contacting the instrument shaft, since, as previously pointed out, the spacing between the retainer and the cabinet panel is sufficient to permit axial movement of the safety control to free it from the shaft. When the safety control is in this disconnected position, it will be impossible to remove the safety control from the cabinet panel since the retainer will prevent the safety control from being withdrawn from the cabinet panel since the diameter of the retainer is greater than the diameter of the aperture 11 in the cabinet panel. Further, since it is impossible to remove the safety control from the cabinet panel, it will likewise be impossible to insert a tool or other object through the hole in the aperture panel, because of the size and arrangement of the parts. It will, therefore, be seen that even when the safety control is mechanically disconnected from the electronic equipment in the cabinet, the safety control still acts as a closure for the aperture in the cabinet panel.

In all forms of the invention presented herein, it is to be understood that the diameter of the control head and the diameter of the control retainer are both greater than the diameter of the opening in the panel through which the control body is insertable. Consequently, it will be possible to move the safety control within the aperture in the panel to an extent limited only by the distance between the retainer and the cabinet panel when the safety control head portion engages the cabinet panel. It will also be seen that the distance between the panel and the control retainer is greater than the distance the shaft is insertable in said control when the chassis is properly disposed in fixed relation to the cabinet.

While specific illustrations have been shown of the invention, it is to be understood that certain modifications and changes may be made without departing from the spirit of the appended claims.

I claim as my invention:

1. In an electrically safe knob assembly for operating an electrified, electrically conductive control shaft of electrical equipment housed in a cabinet, through an opening in a panel of the cabinet: a substantially non-conductive body portion extending through the panel opening, with terminal coupling elements having a depth for operative connection to an outer section of the shaft, and providing a grip element, externally of the panel, insulated from the shaft; and a retainer portion held on said body portion for positioning internally of the panel and wider than the panel opening to prevent the external withdrawal of the assembly from the panel and the consequent exposure of the electrified shaft; said retainer portion being spaced from the grip element by a distance greater than the depth of the coupling elements to provide a limited assembly travel range for connecting and disconnecting the assembly from the shaft without shifting the shaft from place.

2. The combination as defined by claim 1 in which the terminal coupling elements include friction structure for securely carrying the assembly on the shaft, and the body portion is a loose fit in the panel opening.

3. The combination as defined by claim 2 in which the retainer portion includes a wall section extending radially in all directions to distances greater than the panel opening for preventing contact with electrified portions of the equipment by objects passed through the panel opening beside the body portion of the assembly.

4. The combination as defined by claim 2 in which the retainer portion includes a wall section extending radially in all directions to distances greater than the panel opening and the grip element also extends radially in all directions to distances greater than the panel opening for preventing contact with electified portions of the equipment by objects passed through the panel opening beside the body portion of the assembly.

5. In electrical apparatus: an electrified electrically conductive control shaft; a control panel covering the apparatus and having a control aperture aligned with said shaft; and an electrically safe control knob assembly for operating the shaft through the opening, said assembly including a substantially non-conductive body portion extending through the opening, with inner terminal coupling elements operatively connected to an outer section of the shaft, and providing a grip element externally of the panel, insulated from the shaft, said assembly also including a retainer portion held on said body portion internally of said panel and wider than the panel opening for preventing the external withdrawal of the assembly and consequent exposure of the electrified shaft; said retainer portion being spaced from the panel by a distance greater than the length of the connected outer section of the shaft to provide a limited assembly travel range for connecting and disconnecting the assembly from the shaft without shifting the shaft from place.

6. The combination as defined by claim 5 in which the terminal coupling elements include friction structure securely holding the assembly on the shaft, and the body portion is a loose fit in the panel opening.

7. The combination as defined by claim 6 in which the retainer portion includes a wall section extending radially in all directions to distances greater than the panel opening for preventing contact with electrified portions of the equipment by objects passed through the panel opening beside the body portion of the assembly.

8. The combination as defined by claim 6 in which the retainer portion includes a wall section extending radially in all directions to distances greater than the panel opening and the grip element also extends radially in all directions to distances greater than the panel opening for preventing contact with electrified portions of the equipment by objects passed through the panel opening beside the body portion of the assembly.

9. In an electrically safe radio receiver construction for radio receiver systems having electrified chassis: at least one electrified electrically conductive control shaft; a housing covering the chassis and having a control panel with a control aperture aligned with said shaft; and an electrically safe control knob assembly for operating the shaft through the opening, said assembly including a substantially non-conductive body portion extending through the opening, with inner terminal coupling elements operatively connected to an outer section of the shaft, and providing a grip element externally of the panel, insulated from the shaft, said assembly also including a retainer portion held on said body portion internally of said panel and wider than the panel opening for preventing the external withdrawal of the assembly and consequent exposure of the electrified shaft; said retainer portion being spaced from the panel by a distance greater than the length of the connected outer section of the shaft to provide a limited assembly travel range for connecting and disconnecting the assembly from the shaft without shifting the shaft in the housing.

10. The combination as defined by claim 9 in which the housing includes a cover section that can be opened for reaching the chassis, and an electrical interlock is connected with said cover section for automatically de-electrifying the chassis when the cover section is opened.

ALTON J. TORRE.

REFERENCES CITED

The following references are of record in the file of this patent:

UNITED STATES PATENTS

| Number | Name | Date |
|---|---|---|
| 1,350,486 | Bissell | Aug. 24, 1920 |
| 1,447,262 | Monsen | Mar. 6, 1923 |
| 1,489,252 | Hough | Apr. 8, 1924 |
| 1,735,897 | Edgar et al. | Nov. 19, 1929 |
| 1,903,457 | Holstein | Apr. 11, 1933 |
| 2,056,305 | Thomas | Oct. 6, 1936 |

FOREIGN PATENTS

| Number | Country | Date |
|---|---|---|
| 685,381 | Germany | Dec. 16, 1939 |